Patented Nov. 22, 1932

1,888,631

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF NITROGENOUS VAT DYESTUFFS OF THE AZINE SERIES AND THE PRODUCTS

No Drawing. Application filed October 22, 1928, Serial No. 314,311, and in Germany November 3, 1927.

The present invention relates to the production of nitrogenous vat dyestuffs containing a dibenzanthrone or iso-dibenzanthrone radicle.

We have found that valuable vat dyestuffs are obtained by condensing dibenzanthrone or iso-dibenzanthrone, or a derivative thereof which are hereinafter referred to for the sake of brevity as dibenzanthrones, containing at least one nitrogen atom to which a reactive hydrogen atom is attached with an oxygen-free six membered ring compound containing at least one nitrogen atom in the nucleus and substituted by at least one halogen atom, such as halogenpyridine, halogenpyrimidine, 2.4-dichlor-6-methylpyrimidine, 2.4.6-trichlorpyrimidine, cyanuric chlorid, 2-methyl-4.6-dichloro-1.3.5-triazine, 2-phenyl-4.6-dichloro-1.3.5-triazine, 2.4-diphenyl-6-chloro-1.3.5-triazine and the like.

The condensation is suitably carried out in solvents or diluting media of a high boiling point, such as for instance nitrobenzene, nitronaphthalene, trichlorobenzene and the like, preferably in the presence of acid-fixing agents, such as sodium acetate, and condensing catalysts, for instance metal or metal compounds, such as copper, copper oxide, copper carbonate, mercury oxide, aluminium and the like.

When condensing one of the aforesaid heterocyclic compounds containing several halogen atoms, the whole or only a portion of the halogen atoms may be replaced, as desired, by the nitrogenous dibenzanthronyl or iso-dibenzanthronyl radicle. The reactive halogen atoms remaining in the latter case in the condensation product may be further brought to reaction with suitable substances, such as aminoanthraquinones and their derivatives, or other amines, in particular aromatic amines, or compounds containing OH- or SH-groups for instance alcohols, phenols, thiophenols of the aliphatic or aromatic series.

The said latter compounds may also be condensed with the said heterocyclic compounds simultaneously with the aminodibenzanthrones or before. Particularly valuable dyestuffs obtainable in the aforedescribed manner are those derived from the halogenated 1.3.5 triazines which correspond to the general formula

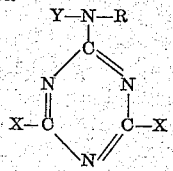

in which R stands for a dibenzanthrone radicle, X for further substituents and Y for hydrogen or an alkyl group.

The new vat dyestuffs obtainable according to the present invention are, for the most part, produced with an excellent yield. For the purpose of purification, they may be treated in the form of pastes with oxidizing agents, for instance hypochlorite, or recrystallized from organic solvents of high boiling point; but in many instances, a simple boiling with solvents is sufficient. According to the selection of the acting components, vat dyestuffs of very varied character are obtained which give extremely fast dyeings, in a great variety of shades, on vegetable fibres from the vat.

The following examples will further illustrate the nature of the said invention which however is not limited thereto. The parts are by weight.

Example 1

A suspension of 470 parts of the aminodibenzanthrone obtainable by reducing the nitrodibenzanthrone obtained according to U. S. Patent No. 796,393, in 3000 parts of nitrobenzene, is boiled and stirred with 65 parts of cyanuric chlorid, 50 parts of sodium acetate and 6 parts of copper carbonate, until the precipitated dyestuff is free from halogen, or still contains only small amounts of halogen. When cold, the product is filtered by suction and is treated in the usual manner. The new dyestuff is a dark powder which dissolves to a violet solution in concentrated sulfuric acid and gives extremely fast green blue dyeings on cotton from a blue alkaline hydrosulfite vat.

By condensing 470 parts of the same aminodibenzanthrone with 122 parts of cyanuric chlorid in naphthalene, in a similar manner, a halogeniferous vat dyestuff is obtained, in the form of blue black needles and giving green blue dyeings on the vegetable fibre from a blue vat.

*Example 2*

470 parts of aminodibenzanthrone, 190 parts of cyanuric chlorid are stirred and heated at about 200° C., for half an hour, in 1000 parts of nitrobenzene, whereupon a further 1000 parts of nitrobenzene, 250 parts of sodium acetate, 20 parts of copper carbonate and 450 parts of 1-aminoanthraquinone, are added. Stirring is continued, at the boiling point of nitrobenzene, until a sample of the reaction product is found to be free, or nearly so, from halogen. When cold, the product is filtered by suction and is treated in the usual manner. The dyestuff, which is obtained in the form of a greenish black powder, dissolves to a wine red solution in concentrated sulfuric acid, and gives very fast yellow green dyeings on cotton from a violet vat.

*Example 3*

94 parts of aminodibenzanthrone, 18.5 parts of cyanuric chlorid, 20 parts of sodium acetate, 1 part of cupric oxid and 25 parts of 1.4-aminomethoxyanthraquinone obtainable by reducing the nitrodibenzanthrone prepared according to the U. S. Patent No. 796,393, are stirred and boiled in 2000 parts of nitrobenzene, until the formation of the dyestuff is completed. When cold, the product is filtered by suction, and treated as usual. The dyestuff, of which an excellent yield is obtained in the form of a black powder, dissolves to a bluish red solution in concentrated sulfuric acid, and gives extremely fast, blue black dyeings on cotton from a blue, alkaline hydrosulfite vat.

*Example 4*

A suspension of 47 parts of monoamino-iso-dibenzanthrone (prepared by reducing the mononitro-iso-dibenzanthrone obtainable by the action of nitric acid on iso-dibenzanthrone in nitrobenzene) in 1500 parts of nitrobenzene, is mixed with the addition of 20 parts of sodium acetate and 7 parts of copper oxid at a temperature of between 80 and 100° C. with a solution warmed to between 80 and 100° C. of 18.5 parts of 2.4.6-trichlor-1.3.5-triazine in 600 parts of nitrobenzene and the mixture heated for 2 hours at 150° C. and for 4 hours at 195° to 200° C. while stirring. After cooling the reaction product is filtered by suction. The dyestuff, a blue powder, dissolves in concentrated sulfuric acid to a green solution and dyes cotton dark blue shades of excellent fastness from a blue vat.

The crude dyestuff may be purified, if desired, by treating its aqueous paste with hypochlorite or other oxidizing agents.

What we claim is:—

1. A process of producing new vat dyestuffs which comprises condensing an oxygen-free six membered ring compound containing at least one nitrogen atom in the nucleus and substituted by at least one halogen atom with a dibenzanthrone containing a nitrogen atom to which a reactive hydrogen atom is attached.

2. A process of producing new vat dyestuffs which comprises condensing an oxygen-free six membered ring compound containing at least one nitrogen atom in the nucleus and substituted by at least one halogen atom with a dibenzanthrone containing a nitrogen atom to which a reactive hydrogen atom is attached in a diluent of a high boiling point.

3. A process of producing new vat dyestuffs which comprises condensing an oxygen-free six membered ring compound containing at least one nitrogen atom in the nucleus and substituted by at least one halogen atom with a dibenzanthrone containing a nitrogen atom to which a reactive hydrogen atom is attached in a diluent of a high boiling point in the presence of an acid-fixing agent.

4. A process of producing new vat dyestuffs which comprises condensing an oxygen-free six membered ring compound containing at least one nitrogen atom in the nucleus and substituted by at least one halogen atom with a dibenzanthrone containing a nitrogen atom to which reactive hydrogen atom is attached in a diluent of a high boiling point in the presence of an acid-fixing agent and a condensing catalyst.

5. A process of producing new vat dyestuffs which comprises condensing a 1.3.5-triazine substituted by at least one halogen atom with a dibenzanthrone containing a nitrogen atom to which a reactive hydrogen atom is attached.

6. A process of producing new vat dyestuffs which comprises condensing cyanuric chlorid with a dibenzanthrone containing a nitrogen atom to which a reactive hydrogen atom is attached.

7. A process of producing new vat dyestuffs which comprises condensing cyanuric chlorid with a dibenzanthrone containing a nitrogen atom to which a reactive hydrogen atom is attached and an aromatic compound containing a NH$_2$-, NH-, OH- or SH-group.

8. A process of producing new vat dyestuffs which comprises condensing an oxygen-free six membered ring compound containing at least one nitrogen atom in the nucleus and substituted by three halogen atoms with a dibenzanthrone containing a nitrogen atom to which a reactive hydrogen atom is attached and an aromatic compound containing a $NH_2$-, NH-, OH- or SH-group.

9. A process of producing new vat dyestuffs which comprises condensing cyanuric chlorid with a dibenzanthrone containing a nitrogen atom to which a reactive hydrogen atom is attached and an aromatic amine.

10. A process of producing new vat dyestuffs which comprises condensing cyanuric chlorid with a dibenzanthrone containing a nitrogen atom to which a reactive hydrogen atom is attached and an aminoanthraquinone.

11. As new articles of manufacture vat dyestuffs of the general formula

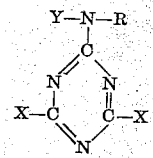

in which R stands for a dibenzanthrone radicle, Y for hydrogen or an alkyl group and X for hydrogen, halogen, an alkyl, an aryl or an arylimino group.

12. As new articles of manufacture vat dyestuffs of the general formula

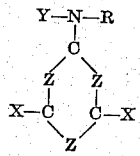

in which at least one of the ring members marked Z is nitrogen, the remaining ring members marked Z being nitrogen or the group C—X, X stands for hydrogen, halogen, an alkyl, an aryl, or an arylimino group, R for a dibenzanthrone radicle and Y for hydrogen or an alkyl group.

13. As new articles of manufacture vat dyestuffs of the general formula

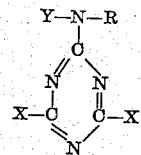

in which R stands for a dibenzanthrone radicle, Y for hydrogen or an alkyl group and one X for hydrogen, halogen, an alkyl, an aryl, or an arylimino group and the other X for an arylimino group.

14. Vat dyestuffs of the general formula

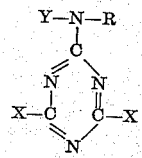

in which R stands for a dibenzanthrone radicle, Y for hydrogen or an alkyl group and one X for hydrogen, halogen, an alkyl, an aryl, or an arylimino group and the other X for an aminoanthraquinone group.

15. The vat dyestuff forming a black powder, dissolving to a bluish red solution in concentrated sulfuric acid, giving extremely fast, blue black dyeings on cotton from a blue vat and corresponding to the formula

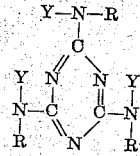

in which R stands for dibenzanthrone radicles, R' for an anthraquinone radicle and Y for hydrogen or an alkyl group.

16. The vat dyestuff forming a green black powder, dissolving to a wine red solution in concentrated sulphuric acid, giving very fast yellow green dyeings on cotton from a violet vat and corresponding to the formula

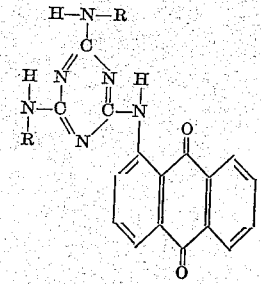

in which each R stands for a dibenzanthrone radicle.

17. The vat dyestuff forming a black powder, dissolving to a bluish red solution in concentrated sulphuric acid, giving extremely fast blue black dyeings on cotton from a blue vat and corresponding to the formula

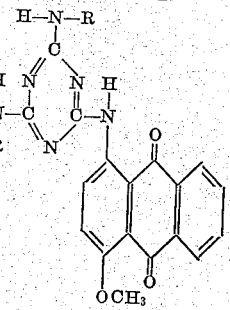

in which each R stands for a dibenzanthrone radicle.

In testimony whereof we have hereunto set our hands.

MAX ALBERT KUNZ.
KARL KOEBERLE.